United States Patent [19]

Pohl

[11] 4,408,391

[45] Oct. 11, 1983

[54] CONDUCTOR INSERTION TOOL AND METHOD

[75] Inventor: Karl-Heinz Pohl, Woodbury, Conn.

[73] Assignee: The Siemon Company, Watertown, Conn.

[21] Appl. No.: 233,983

[22] Filed: Feb. 12, 1981

[51] Int. Cl.$^3$ ........................ H01R 43/04; B23P 19/00

[52] U.S. Cl. ........................................ 29/861; 29/751; 7/107; 30/124

[58] Field of Search ...................... 29/566.4, 748, 758, 29/278, 751; 30/337, 339, 124; 7/107, 158

[56] References Cited

U.S. PATENT DOCUMENTS 3,628,202 12/1971 Brown .............................. 29/748 X 3,883,316 5/1975 Mason .............................. 30/124 X 3,898,724 8/1975 Conorich ............................ 7/107 X 4,161,061 7/1979 Mason et al. ...................... 29/278 X 4,194,256 3/1980 Knickerbocker ........................ 7/107

*Primary Examiner*—Francis S. Husar

*Assistant Examiner*—Carl J. Arbes

*Attorney, Agent, or Firm*—David S. Fishman

[57] ABSTRACT

A tool for inserting a wire between resilient contact portions of a connector. The tool has a handle portion and a reversible stem portion and the stem portion includes a blade extending from opposite sides thereof. The blades are generally in the form of I-beams and, in use, the channels at either side of the beam engage the connector contact portions while the web portion of the beam serves as anvil which supports the wire in the region between the contact during insertion.

21 Claims, 8 Drawing Figures

CONDUCTOR INSERTION TOOL AND METHOD

BACKGROUND OF THE INVENTION (1) Field of the Invention

This invention is directed to hand tools for use in the insertion of conductors in solderless connectors and especially to tools for use in the installation of individual conductors of communications cables in connectors extending from terminal blocks. More particularly, the present invention relates to the establishment of solderless connections between electrical conductors, particularly insulated conductors, and closely spaced connectors in communications systems. Accordingly, the general objects of the present invention are to provide novel and improved tools and methods of such character.

(2) Description of the Prior Art

While not limited thereto in its utility, the present invention is particularly well suited for use with the multiple electrical connector of co-pending application Ser. No. 184,665, filed Sept. 8, 1980. Co-pending application Ser. No. 184,665, Sept. 8, 1980 which is assigned to the assignee of the present invention, is hereby incorporated herein by reference.

The present invention has been found to be particularly useful in the communications field and especially in the art of telephony. It is common, in the installation of a telephone system, for multiple conductor telephone cables to be terminated at a mounting block which has a plurality of solderless connectors extending outwardly therefrom. The cable conductors are inserted in connectors, typically between a pair of opposed fingers, in such a manner as to establish electrical connection without resort to bonding techniques such as soldering. The connectors, and particularly the opposed fingers or other elements between which each of the cable conductors is inserted, are designed such that any insulation on the conductor is removed therefrom as the conductor is forced between the opposing elements of the connector.

In the prior art, wherein the opposing contact elements of the connectors were formed flat stock, wire installing tools of the type disclosed in U.S. Pat. No. 4,194,256 have been designed for use by the technician. These prior wire installing tools, however, cannot be employed in the insertion of electrical conductors in the connectors of a multiple connector assembly of the type disclosed in referenced application Ser. No. 184,665. To be more specific, referring to prior art "flat" connectors of the type known in the art as the "66 Type", which are shown in U.S. Pat. No. 3,112,147, the installing tool must be provided with an internal cavity which functions to hold the fingers or beams of the connector together as a conductor is forced therebetween. If too much spreading of the connector fingers is permitted, the fingers typically being comprised of copper alloys, the material will undergo cold flow in the base regions of the fingers and there will be insufficient force applied to the conductor to insure its permanent capture between the fingers. The connectors of application Ser. No. 184,665 are defined by high strength coil segments. As a conductor is forced between a pair of these opposed coil segments, the forces imposed on the outermost portions of the connector are high while those at the bottom of the cooperating elements or segments remain low. This is precisely the opposite to what occurs in a "66 Type" connector. Accordingly, there is no danger of cold flow of the copper wire which defines the connector segments. Thus, a tool cavity to prevent excessive spreading of the fingers of the connector is not required.

A further disadvantage of prior art wire installing tools of the type disclosed in U.S. Pat. No. 4,194,256 resides in the fact that, because the conductor being inserted must span the internal cavity or chamber in the tool stem which receives the connector fingers, the installing tool cannot be used with stranded wire. As is well known, stranded wire has minimal flexural strength and the wire will inherently be bent in the portion which is in registration with the tool cavity. Thus, in the prior art, solid wire must be used with 66 Type connectors.

It is also to be noted that with very compliant wire, particularly stranded wire, spreading apart of the connector fingers as the wire is inserted therebetween may result in a failure of the insulation to be stripped from the wire. Thus a simple blade-type tool could not successfully be employed to insert stranded wire in a connector of the type shown in application Ser. No. 184,665.

A further deficiency of prior art wire installing tools resides in the fact that the minimum dimensions of the stem portions of such tools are comparatively large and, of course, the present tendency is for increasingly high connector density. Even if the prior art tools could be modified for use with connectors of the type disclosed in application Ser. No. 184,665, the working portion of the tools, the tool of U.S. Pat. No. 4,194,256 for example, would be too large to be of practical use.

SUMMARY OF THE INVENTION

The present invention overcomes the above briefly discussed and other deficiencies and disadvantages of the prior art by providing a novel and improved tool which may be utilized to insert conductors in individual connectors of a multiple connector assembly fabricated from a continuous strip of wire formed and shaped into adjacent and abutting loops. The tool of the present invention may also be employed to insert stranded wire in various types of electrical connectors characterized by a pair of cooperating opposed fingers or elements.

A tool in accordance with the preferred embodiment of the present invention is characterized by a handle and a stem portion which extends from the handle. The stem portion, viewed in cross-section intermediate its length, has a generally I-beam shape. In a preferred embodiment one end of this "I-beam"; i.e., the flange portion at one side of the web or rib portion of the beam; will extend outwardly past the remainder of the stem and be shaped, at its end, to form a wire cutting edge. During insertion of a conductor between the coil segments of a connector of a multi-connector assembly formed from a continuous strip of wire which has been shaped to define adjacent and abutting loops, the web portion of the "I-beam" will remain in contact with the portion of the conductor which is positioned between the opposing connector elements during the entire insertion procedure whereby buckling or flexing of the conductor in the connector is prevented. Therefore, if desired, stranded conductors may be employed, which is a significant advance over the prior art.

As will be discussed in greater detail below, a tool in accordance with a preferred embodiment of the present invention will be dimensioned for use with a terminal block of the type disclosed in referenced application Ser. No. 184,665 such that the flange portions of the "I-beam" are always within the perimeter of that portion of the plastic housing which defines a channel into which the coil segments protrude. Accordingly, the cutting edge formed at one end of the beam cannot puncture feed conductors in channels between connector locations.

A tool in accordance with a preferred embodiment of the invention is characterized by an elongated interruption in the rib portion of the "I-beam". This interruption receives the connector fingers or loops and thus minimizes the spreading thereof during wire insertion and, most importantly, insures that the connector will exert sufficient force on the wire being inserted to strip the insulation from even compliant stranded wire.

Also in accordance with a preferred embodiment, the width of the rib portion of the "I-beam" will not exceed the diameter of the wire to be inserted. In the case of solid wire; i.e.; single conductor wire; the rib width will be less than the conductor diameter. In the case of stranded wire, the rib width will preferably not exceed 1.5 times the diameter of a single strand.

A particularly unique feature of a tool in accordance with the present invention, when intended for use with a connector assembly of the type depicted in application Ser. No. 184,665, is that the tool may be dimensioned so as to permit the insertion of two wires between a single pair of cooperating connector elements; i.e., a single pair of coil segments. In the prior art, it was possible to reliably insert only a single conductor between a pair of cooperating solderless connector fingers or elements. In accordance with a preferred embodiment of the present invention, the protrusion of the cutting blade portion of the "I-beam" beyond the end of the remaining portion of the beam will be slightly less than the diameter of two wires.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENTS

Figure 2:
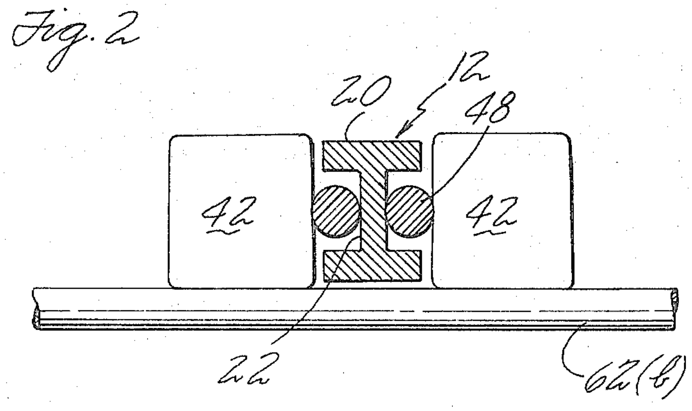
FIG. 2 is a cross-sectional end view, taken along line A—A of FIG. 7, on an enlarged scale, of the stem portion of the tool of FIG. 1, FIG. 2 showing the tool and a portion of a connector.

The disclosed embodiment of the present invention will be described below in relation to the connector assembly of co-pending application Ser. No. 184,665 and FIGS. 2, 6 and 7 show portions of such a connector assembly in addition to the stem portion of an insertion tool in accordance with the present invention. Referring jointly to FIGS. 1–4, a conductor insertion tool in accordance with a preferred embodiment comprises a handle, indicated generally at 10, and a stem, indicated generally at 12. Handle 10 will typically be comprised of two pieces of molded plastic which are pivotally joined together at a first end by means of a rivet 14 or other suitable fastener. The two portions of the handle are shaped so as to define a stem receiving slot therebetween and the handle portions and stem are interconnected at a second end of handle 10 by means of a bolt 16 and associated nut. As may be seen from FIGS. 1 and 3–5, the stem portion 12 of the tool is preferably reversible. The stem portion 12 thus has an intermediate body portion 18 and, extending from opposite ends thereof, a pair of blade portions which are respectively indicated at 20 and 20'. The center body portion 18 of the stem 12 is of increased width when compared to the blade portions 20; the body portion 18 tapering inwardly to the blade portions in intermediate sections 19 and 19' and the entire stem 12 being formed from a single piece of material. In the embodiment of FIGS. 1–4, the blade portions themselves taper slightly in width from the intermediate sections 19 to the ends thereof.

Figure 1:
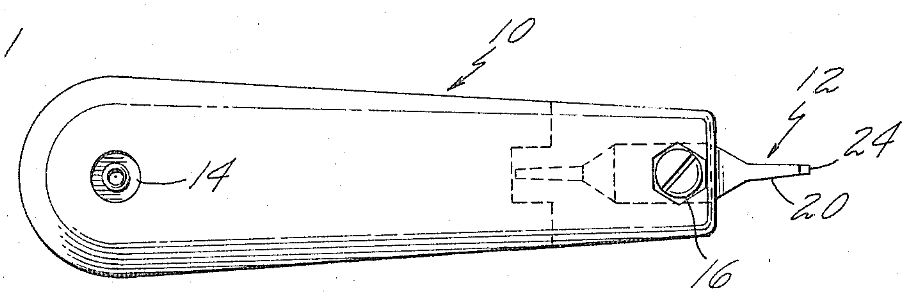
FIG. 1 is a side elevation view of a tool in accordance with a preferred embodiment of the present invention.
Figure 3:
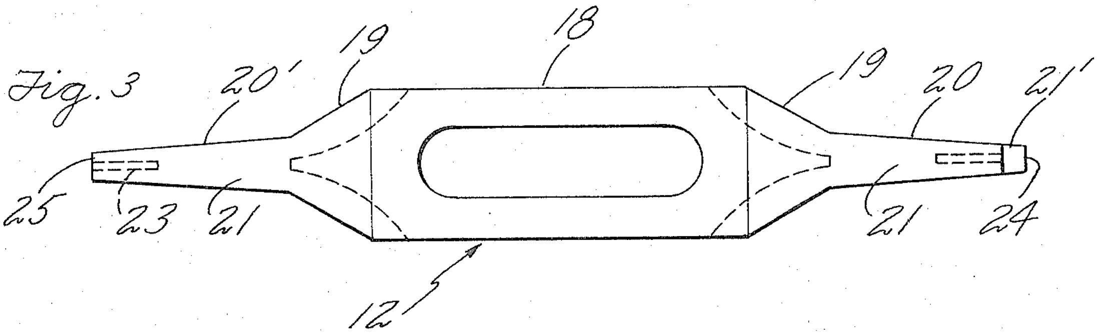
FIG. 3 is a side elevation view, on an enlarged scale, of the stem portion of the tool of FIG. 1.
Figure 4:
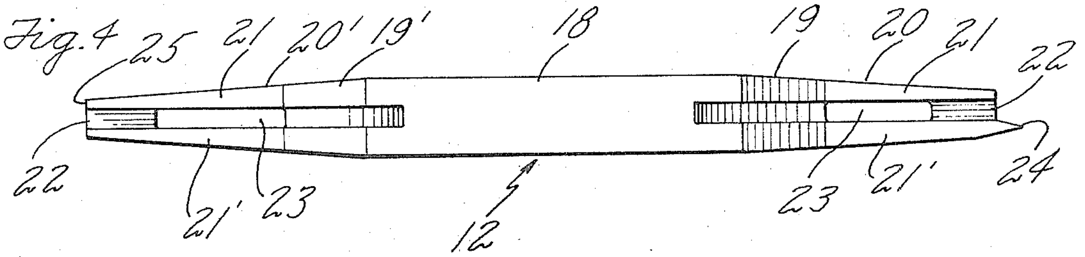
FIG. 4 is a bottom view of the tool stem of FIG. 3.

The shape of the blade portions 20 and 20' of stem 12 may clearly be seen from a joint consideration of FIGS. 2–4. FIG. 2 is a cross-sectional view of portion 20 of the stem and shows the tool positioned between a pair of uprights 42 of a connector of the type of application Ser. No. 184,665. The blade portions 20 are generally of "I-beam" shape in that they have flat parallel flange members 21 and 21' separated by a rib or web member 22. As shown in FIG. 2, the opposite sides of the web member 22 of the "I-beam" will contact straight loops or coil segments of a conductor 48 which defines the connector flanges; these coil segments being formed so as to be resiliently biased toward one another. Thus, in the fabrication of a tool in accordance with the present invention, the width of the web portion of the I-beam will be selected so as to be slightly larger than the diameter of the conductor from which the pairs of cooperating segments of each individual connector are formed. It is, of course, possible to form the stem 12 so that the dimensions of the I-beam portions 20 and 20' are different.

Continuing to refer to FIGS. 3 and 4, in the preferred embodiment of the present invention the thickness of the rib or web member 22 of each of the blade portions 20 will also be selected such that it does not exceed the diameter of the wire to be inserted in the connector. Thus, when a solid or single conductor wire is to be inserted, the thickness of web portion 22 must be less than the diameter of the wire. In the case of stranded wire, wherein the individual conductors will typically be parallely oriented rather than being twisted, the thickness of web portion 22 should approximate the diameter of a single strand and should not exceed $1\frac{1}{2}$ times the diameter of a single strand.

As may best be seen from FIG. 4, also in accordance with the preferred embodiment of the present invention the web portion 22 is removed for a substantial portion of the length of blade portions 20, so as to define elongated openings 23; the length of the web or rib thus typically being in the range of 0.10 to 0.15 inches. Referring to the connector as shown in FIG. 6, when the tool of the embodiment of FIGS. 1–4 is employed to insert a wire between a pair of coil segments of the conductor 48, the adjacent coil segments will because of their resiliency move into the opening 23 and into contact with one another when the comparatively short web portion is extended downwardly between the conductor segments. Thus, the provision of the openings 23 minimizes the spreading of the coil segments and thus maximizes the force which the coil segments will exert on the wire during insertion. Thus maximizing of the forces exerted on the wire by the conductor coil segments insures that the insulation will be stripped from the wire by the coil segments during the insertion procedure. In the case of very flexible wires, and particularly stranded conductors, the exertion of a downward force by the tool will cause the individual conductors of the wire to align and, if the coil segments remain spread apart by a distance corresponding to the width of the web 22 of the tool blade, there may not be enough force between the individual strands in the conductor and the coil segments of the connector to strip the insulation from the wire.

FIGS. 3 and 4 also clearly show the double-ended or reversible nature of the blade of the tool in accordance with the preferred embodiment of the invention. The first end of the tool, which includes the cutting blade 24, is used for wire insertion and subsequent severing of the inserted wire. The second or opposite end of the tool does not include a cutting blade 24 and thus presents a straight edge or anvil 25 which extends between the flanges 21 and 21′. The cutting edge 24 is preferably formed so as to have the configuration depicted in FIG. 4; i.e., the edges are defined by angling the outside of the flange 21′, from a point immediate the ends of the web 22, inwardly at a first angle and angling the other side of the flange outwardly, from the end of web 22, at a second angle. The stem 12 is, of course, reversible by removing the screw 16 so that it may be used for wire insertion only or insertion and subsequent cutting. As an alternative, the stem 12 may be provided with a cutting blade on each end.

Figure 5:
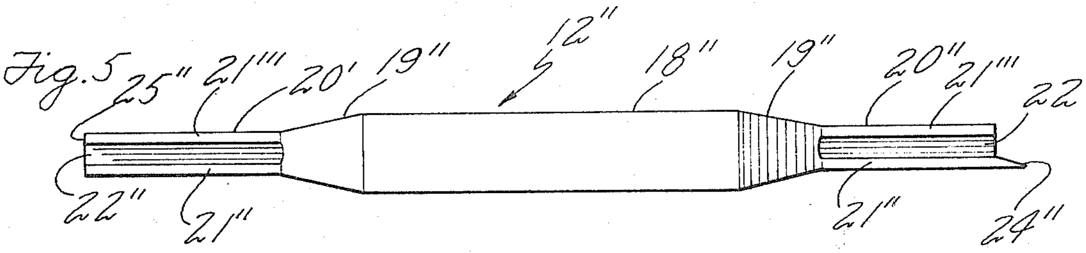
FIG. 5 is a view, similar to FIG. 4, of the stem portion of a tool in accordance with a second embodiment of the invention.
Figure 6:
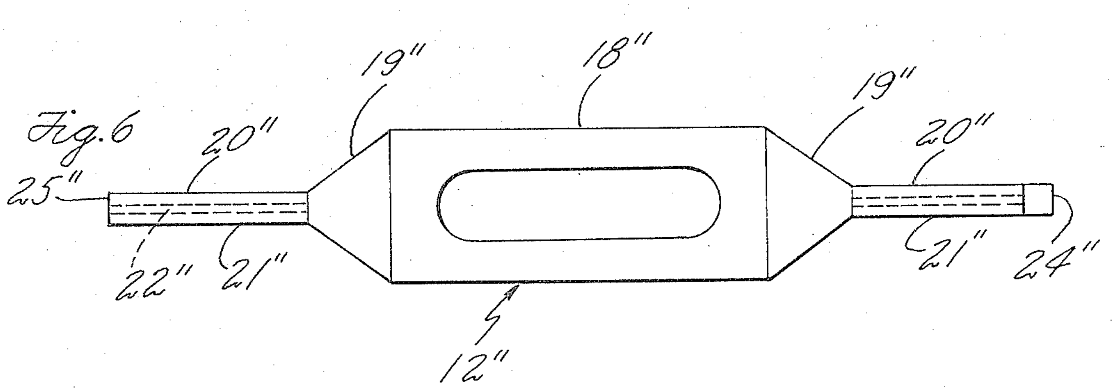
FIG. 6 is a view, similar to FIG. 3, of the tool of FIG. 5.
Figure 7:
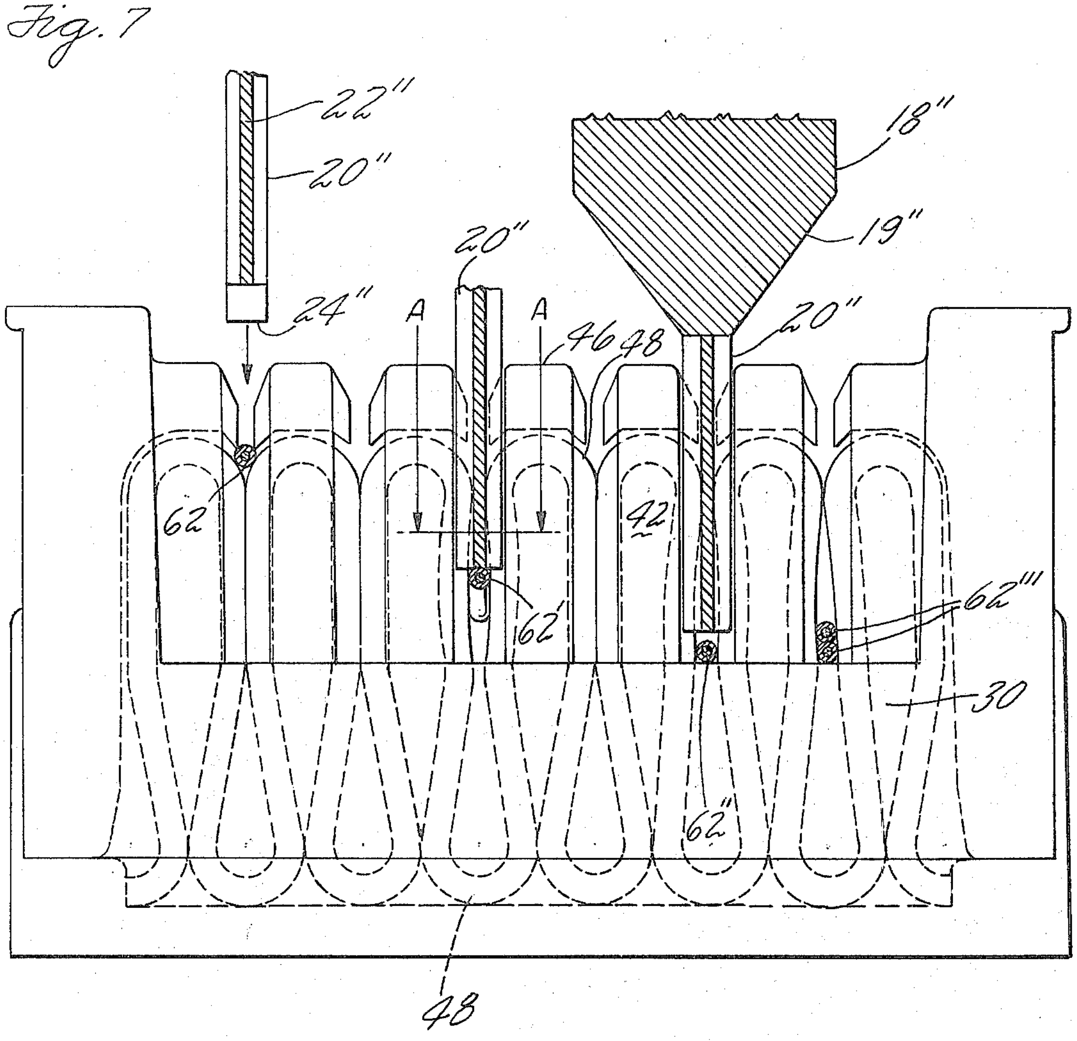
FIG. 7 is a side elevation view depicting use of the tool of FIG. 5.
Figure 8:
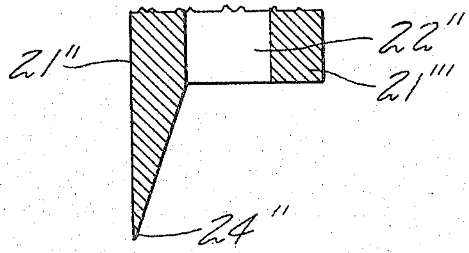
FIG. 8 is a further view, rotated 90° with respect to FIG. 7, which depicts use of the present invention and shows a unique feature thereof.
Figure 8:
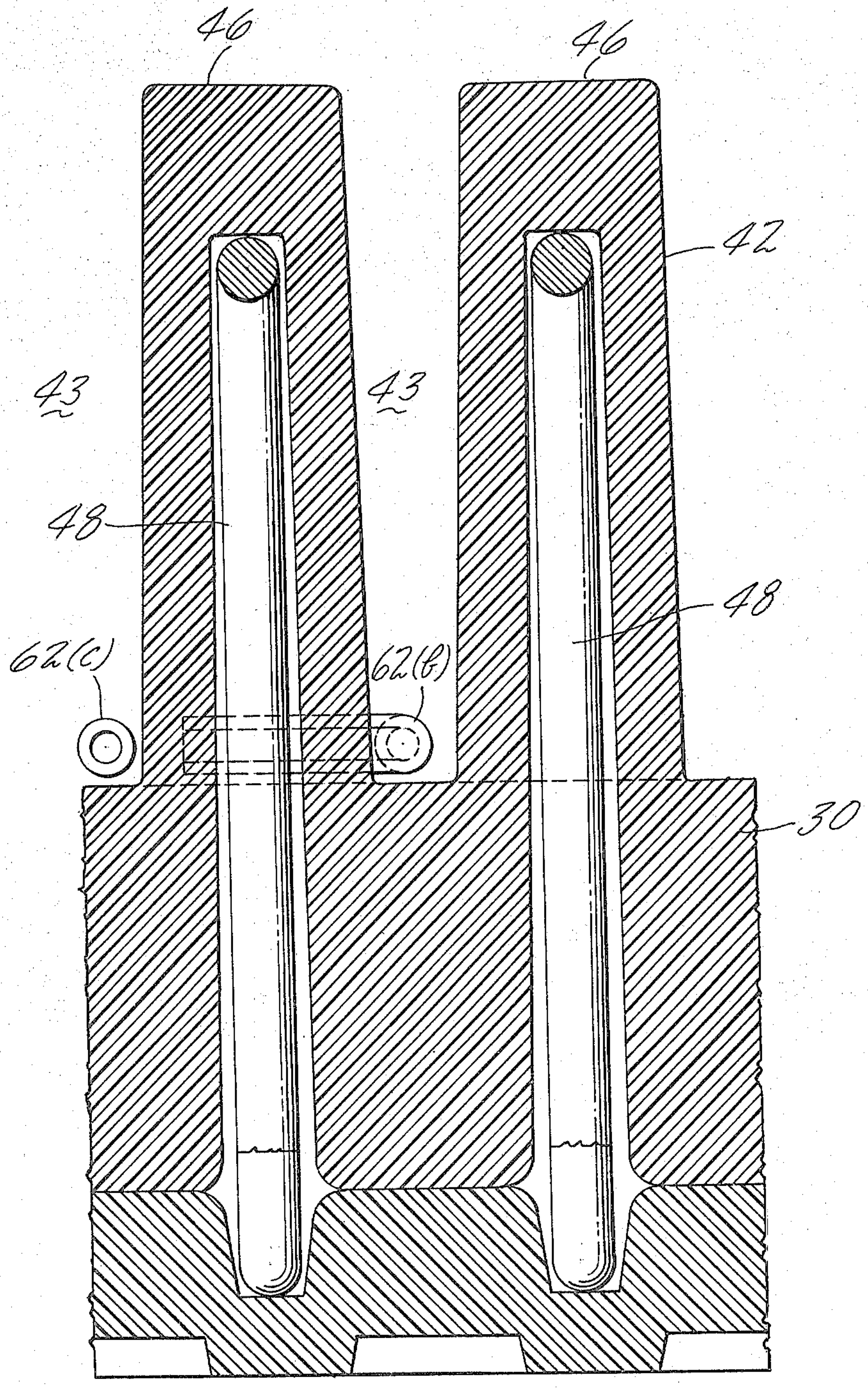

Referring to FIGS. 5 and 6, a tool stem 12′ in accordance with a second embodiment of the present invention is shown. The principal difference between the tool stem of FIGS. 5 and 6 and the stem of FIGS. 1–4 resides in the fact that the web portion 23″ of the "I-beam" is continuous in the FIGS. 5 and 6 embodiment. Additionally, the shape of the cutting blade 24″ of the FIGS. 5 and 6 embodiment is different from that described above; the cutting edge of the FIGS. 5 and 6 embodiment being aligned with the outer surface of flange member 21″ and 21‴ of the blade portion 20‴. It is additionally to be noted that, in the FIGS. 5 and 6 embodiment, the body portion 18″ of stem 12″ is of increased cross-sectional area when compared to the blade portions 20″ and thus the intermediate sections 19″ taper inwardly from all four sides to the blade portions 20″. Additionally, since the web portions of the "I-beam" sections are not cut away to define openings, such as the openings 23 of the embodiment of FIGS. 1–4, in the embodiment of FIGS. 5 and 6 the blade portions 20 need not be tapered to give added strength to the blade portions. In FIGS. 7 and 8, which will be described below, a tool having a stem portion as depicted in FIGS. 5 and 6 is shown. The manner of use of the tool including the stem of FIGS. 5 and 6 is, of course, essentially identical to the manner of use of a tool having a stem as depicted in FIGS. 1–4; the primary difference in operation being that resulting from the provision of the openings 23 in the web portion in the embodiment of FIGS. 1–4.

Referring to FIG. 7, a mounting block or connector of the type of application Ser. No. 184,665 is shown in a front elevation view with the insulated wires of a multi-conductor communications cable depicted in various stages of insertion in the connector using a tool in accordance with the present invention. Thus, starting at the left, a first insulated wire 62 is shown positioned for insertion in the connector with the I-beam portion 20″ of the tool stem positioned immediately above the conductor.

In the region of the second connector, proceeding from left to right, a second wire 62′ has been shown partly inserted and the I-beam 20″ has been partly broken away to show that the end of the web portion 22″ of the I-beam maintains contact with the wire 62′ over the entire length of the wire which is positioned between the cooperating loops of the connector. It is further to be noted that the forces imposed on the wire 62′ by the loop segments of the connector are sufficiently strong so as to remove any insulation from the wire whereby good electrical contact will be established between the wire conductor and the wire 48 which forms the loop segments. When using stranded or very flexible single conductor wire, a tool as shown in FIGS. 1–4 may be required to insure stripping of the insulation. In either case, the wire conductor or conductors will be securely captured between the cooperating loop segments of the connector upon removal of the tool.

Proceeding further to the right, a wire 62″ is shown fully inserted in the connector block. When the wire 62″ has been fully inserted the cutting edge 24, if present, will sever the wire at a first side of the connector; the severing action taking place as the cutting edge continues to move downwardly while further movement of the wire is prevented by the base portion 30 of the connector block.

Moving further to the right, a pair of wires are shown installed in a single connector; the installation having been accomplished employing the tool of the present invention. The tool of the present invention may be employed to insert a pair of wires in a single connector by appropriate selection of the length d of the cutting blade edge extension of the I-beam. Specifically, if the tool is to be employed to install a pair of wires in a single connector, the length d (see FIG. 5) is selected to be slightly less than twice the width of the wires which are being inserted in the connector.

Referring now to FIG. 8, which is an enlarged partial cross-sectional view of the FIG. 7 connector block assembly taken transversely to the FIG. 7 view, it is to be noted that the cross-pieces 46 and uprights 42 of the block define rows of channels 43 and that conductors, which will typically be brought into the connector via a fanning strip on one end thereof, are positioned within these channels; a pair of these conductors being indicated at 62(*b*) and 62(*c*) in FIG. 8. In fabricating the tool of the present invention care is taken to insure that the width of the flanged end portions of the I-beam 20 is less than the width of the uprights 42. Accordingly, the tool of the present invention, since its downward movement is guided by engagement of the loop segments of wire 48 with the U-shaped channels at the sides of the I-beam, cannot contact and thus damage or sever the "row" conductors 62(*b*) and 62(*c*). A row conductor 62(*b*) is also shown in FIG. 2.

While preferred embodiments have been shown and described, various modifications and substitutions may be made thereto without departing from the spirit and scope of the present invention. Accordingly, it is to be understood that the present invention has been described by way of illustration and not limitation.

What is claimed is:

1. In a wire installing tool of the type having a handle and a stem, the stem having first and second ends and being reversibly mounted on and extending from the handle, an improved stem comprising:
- a body portion, said body portion being apertured to permit installation thereof in the handle;
- a pair of blade means, said blade means being integral with said body portion and each comprising:
  - a pair of parallel spatially displaced flange members; and
  - a web member interconnecting said flange members, said web member being generally transverse to said flange members and being positioned therebetween so as to cooperate with said flange members to define a generally U-shaped channel at either side of said web member; and
- a cutting blade extension of at least one of said blade means flange members.

2. The apparatus of claim 1 wherein at least one of said blade means web member is of shorter length than the flange members which it interconnects, said web member extending inwardly from the free end of at least one of said flange members for a distance less than the length of said flange member, a passage through said blade means being defined by said flange members and said shorter length web member.

3. The apparatus of claim 1 wherein said blade means web members are of shorter length than said flange members and extend inwardly from the free end of at least one of said flange members for a distance less than the length of said flange members whereby a passage through each of said blade means is defined by said flange member and web members.

4. The apparatus of claim 1 wherein said blade means each further comprise:
- means interconnecting said blade means to said body portion, said interconnecting means tapering from said body portion to said blade means flange members.

5. The apparatus of claim 2 wherein said blade means each further comprise:
- means interconnecting said blade means to said body portion, said interconnecting means tapering from said body portion to said blade means flange members.

6. The apparatus of claim 3 wherein said blade means each further comprise:
- means interconnecting said blade means to said body portion, said interconnecting means tapering from said body portion to said blade means flange members.

7. The apparatus of claim 1 wherein the thickness of said web member of each of said blade means is larger than the diameter of the individual conductors of a stranded wire to be installed with the tool and less than the total diameter of all of the conductors of the stranded wire.

8. The apparatus of claim 7 wherein the thickness of said web member is approximately 1.5 times the diameter of the smallest strand in the stranded wire.

9. The apparatus of claim 3 wherein the thickness of said web member of each of said blade means is larger than the diameter of the individual conductors of a stranded wire to be installed with the tool and less than the total diameter of all of the conductors of the stranded wire.

10. The apparatus of claim 9 wherein the thickness of said web member is approximately 1.5 times the diameter of the smallest strand in the stranded wire.

11. The apparatus of claim 10 wherein said blade means each further comprise:
- means interconnecting said blade means to said body portion, said interconnecting means tapering from said body portion to said blade means flange members.

12. The apparatus of claim 1 wherein the thickness of said web member of each of said blade means is less than the diameter of the conductor of a wire to be installed with the tool.

13. The apparatus of claim 12 wherein said web thickness is approximately 80% of the diameter of the conductor of the wire to be installed.

14. The apparatus of claim 13 wherein said blade means each further comprise:
- means interconnecting said blade means to said body portion, said interconnecting means tapering from said body portion to said blade means flange members.

15. The apparatus of claim 1 wherein the width of said U-shaped channels is selected to be at least 10% greater than the maximum width of a pair of cooperating contact members between which a wire is to be installed with the tool.

16. The apparatus of claim 11 wherein the width of said U-shaped channels is selected to be at least 10% greater than the maximum width of a pair of cooperating contact members between which a wire is to be installed with the tool.

17. The apparatus of claim 14 wherein the width of said U-shaped channels is selected to be at least 10% greater than the maximum width of a pair of cooperating contact members between which a wire is to be installed with the tool.

18. The apparatus of claim 1 wherein said U-shaped channels are on opposite sides of each of said blade means web members and extend from points on said body portion to the ends of said blade means.

19. The apparatus of claim 1 wherein said cutting blade extension projects outwardly from the end of said blade means flange member by a distance which is greater than the diameter of a single wire to be installed and less than the diameter of two of the wires to be installed.

20. A method of installing a wire in an electrical connector, the connector having at least a pair of cooperating contact portions which are resiliently loaded in opposite directions so as to exert a capture force on the wire and to exert a stripping force for the removal of insulation from the wire during movement of the wire relative to the cooperating contact portions, said method comprising the steps of:
- positioning a wire to be installed at the top of the connector and in registration with the junction of a pair of cooperating contact portions;

supporting the wire from one side along the portion thereof which is to be inserted between the contact portions;

engaging the sides of the contact portions which are to act on the wire; and forcing the wire downwardly between the contact portions without restraining movement of the contact portions whereby the contact portions are caused to spread apart by the wire while guiding the movement of the supported wire.

21. The method of claim 20 wherein the steps of supporting and engaging comprise:

positioning the web element of an I-shaped member against the wire and causing the contact portions to engage the channels at opposite sides of the I-shaped member web element.

* * * * *